June 8, 1965  J. S. DAVIES  3,187,552
SLIP METER APPARATUS AND METHOD FOR MEASURING
FRICTIONAL PROPERTIES OF MATERIALS
Filed March 1, 1963  3 Sheets-Sheet 1
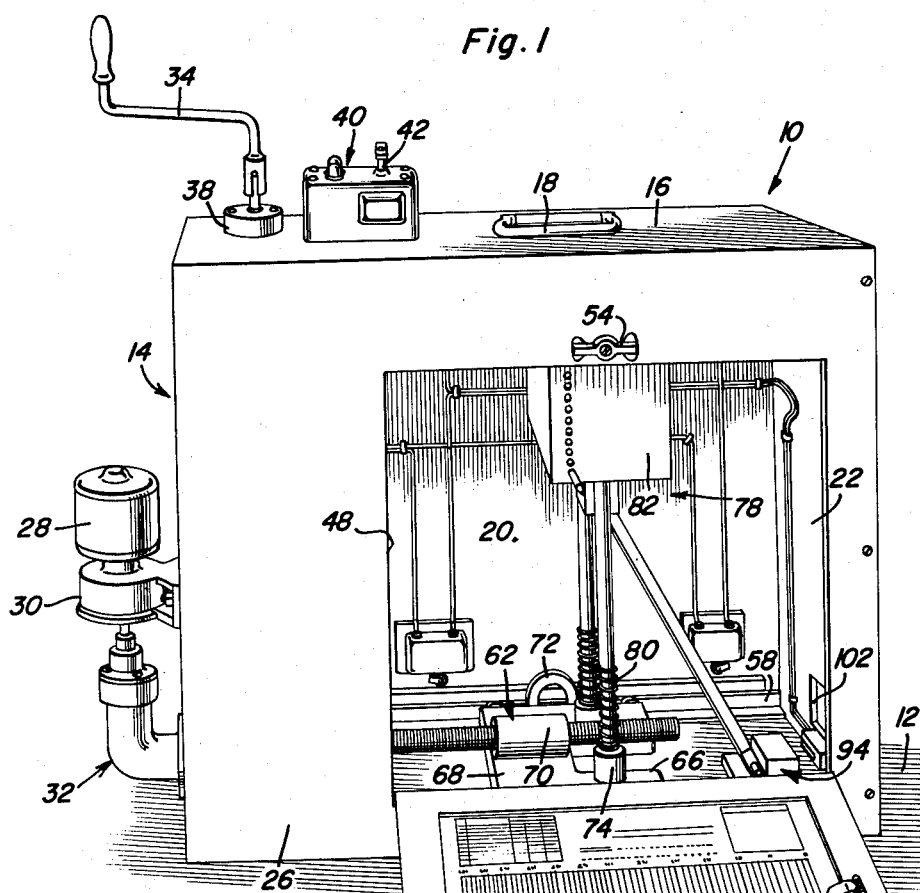
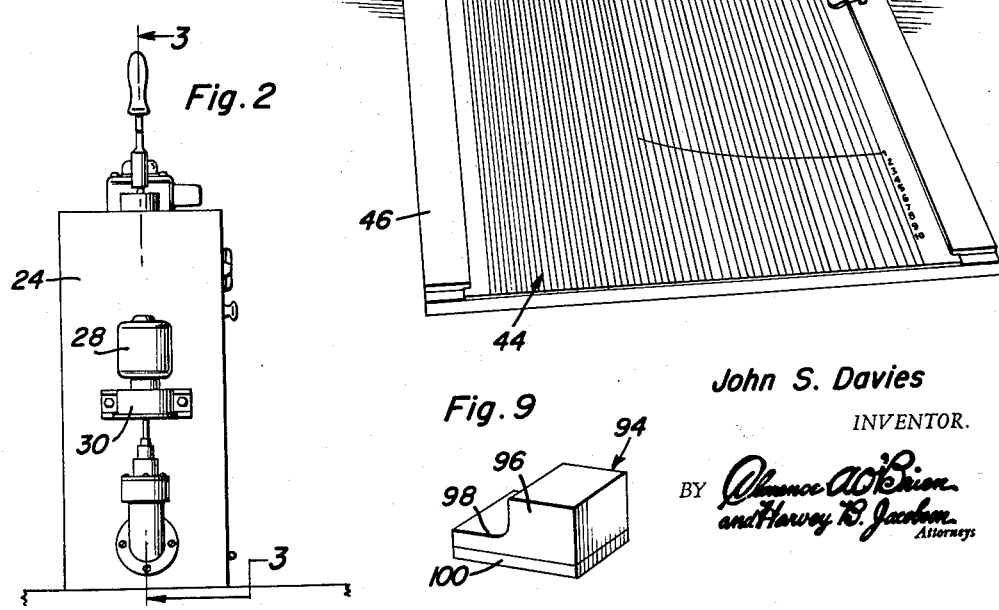
John S. Davies
INVENTOR.

John S. Davies
INVENTOR.

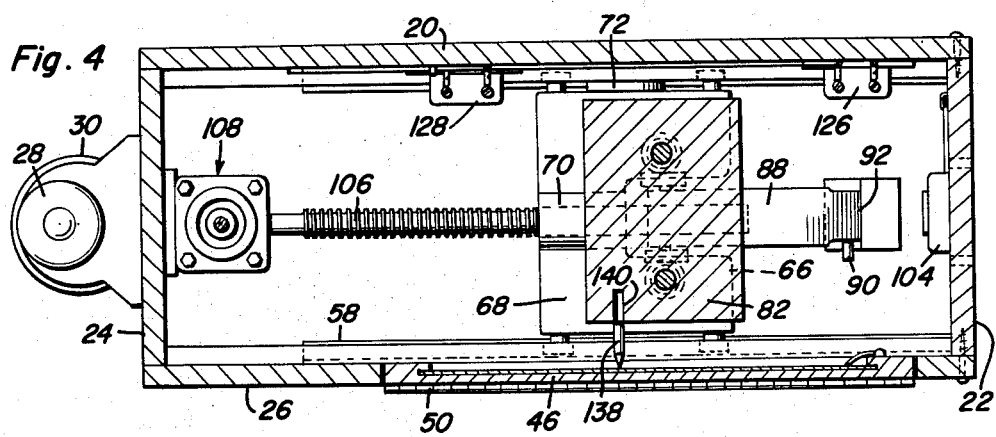
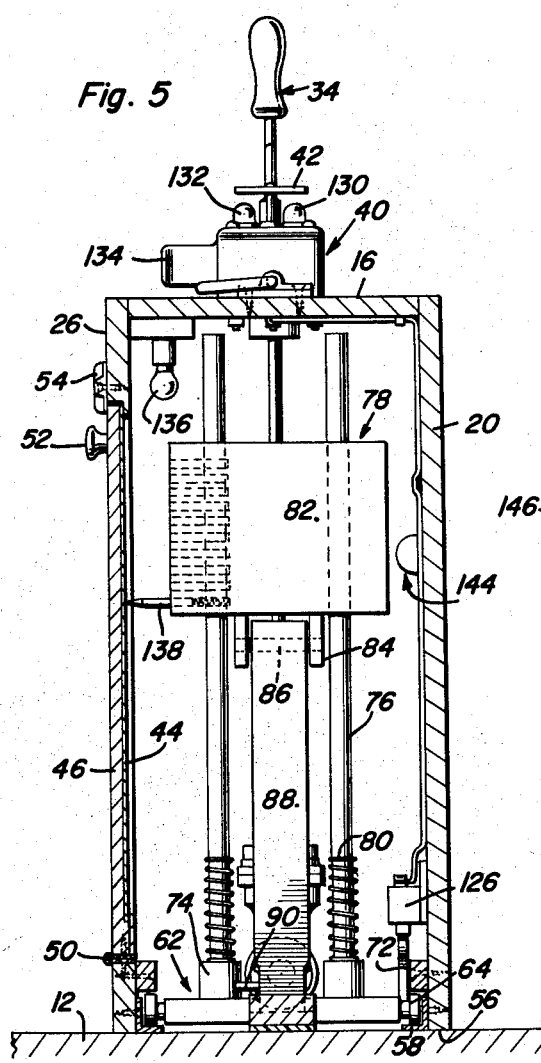
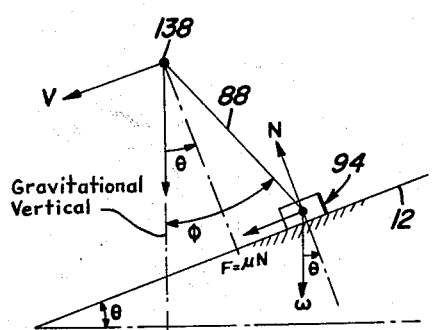
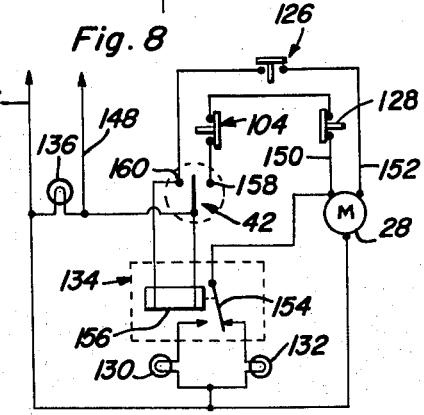
John S. Davies
INVENTOR.

United States Patent Office 3,187,552
Patented June 8, 1965

3,187,552
SLIP METER APPARATUS AND METHOD FOR MEASURING FRICTIONAL PROPERTIES OF MATERIALS
John S. Davies, 1010 Norumbega Ave., Monrovia, Calif.
Filed Mar. 1, 1963, Ser. No. 261,977
21 Claims. (Cl. 73—9)

This invention relates to a portable type of friction testing or measuring device. It is a principal object of the present invention to provide a portable type of device which may be placed on any surface for the purpose of measuring its static friction properties in a more facile and accurate manner.

The device of the present invention therefore involves a friction testing method whereby the static friction developed between a test surface and some other friction material in contact therewith may be accurately measured regardless of the inclination of the test surface.

An additional object of the present invention is to provide a portable type of friction testing machine which may be set into operation in order to undergo a friction testing procedure during which time a direct reading recording is made from which information may be derived for computing various frictional property indexes such as the coefficient of static friction.

A further object of the present invention is to provide a friction testing machine in which a predetermined load is vertically placed on an interchangeable friction shoe element at an operative starting position from which the shoe element is displaced by a limited amount when the limiting static friction developed between the test shoe and the surface being tested is exceeded. A progressively decreasing angle between the vertical load and the test shoe produces the limited displacement of the test shoe when the limiting friction is exceeded, this progressive decrease in the angle being achieved by a reversible drive arrangement whereby the load is moved at a constant rate in one direction from its starting position and stopped when the test shoe is displaced. The movement of the load before and after displacement of the test shoe is therefore continuously recorded so that the angle between the vertical load and the test shoe may be indicated from which the static coefficient of friction may be computed. The friction coefficient may thereby be computed with respect to different materials contacting the friction surface by easy replacement of the test shoe element as one of the important features of this invention. Also, facilities are provided for measuring the inclination of the surface being tested which will be necessary in any accurate computation of the frictional coefficient. Accordingly, the starting position of the friction testing device involves alignment of the load with the test shoe element along a gravitational vertical rather than a perpendicular relationship to the surface being tested.

The portable testing device of the present invention also features facilities for operating the device either by electric power or manually and also is provided with control facilities whereby the operative condition of the device may be immediately discerned and whereby it may be reset to its starting condition at the proper time.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the friction testing device with the recording panel thereof open.

FIGURE 2 is an end elevational view of the friction testing device.

FIGURE 4 is a top sectional view taken substantially through a plane indicated by section line 4—4 in FIGURE 3.

FIGURE 5 is a transverse sectional view taken substantially through a plane indicated by section line 5—5 in FIGURE 3.

FIGURE 7 is a vector diagram illustrating the forces involved in connection with the friction testing method of the present invention.

FIGURE 8 is an electrical circuit diagram illustrating the control system associated with the testing device of the present invention.

FIGURE 9 is a perspective view of a typical test shoe element utilized with the testing device.

Figure 3:
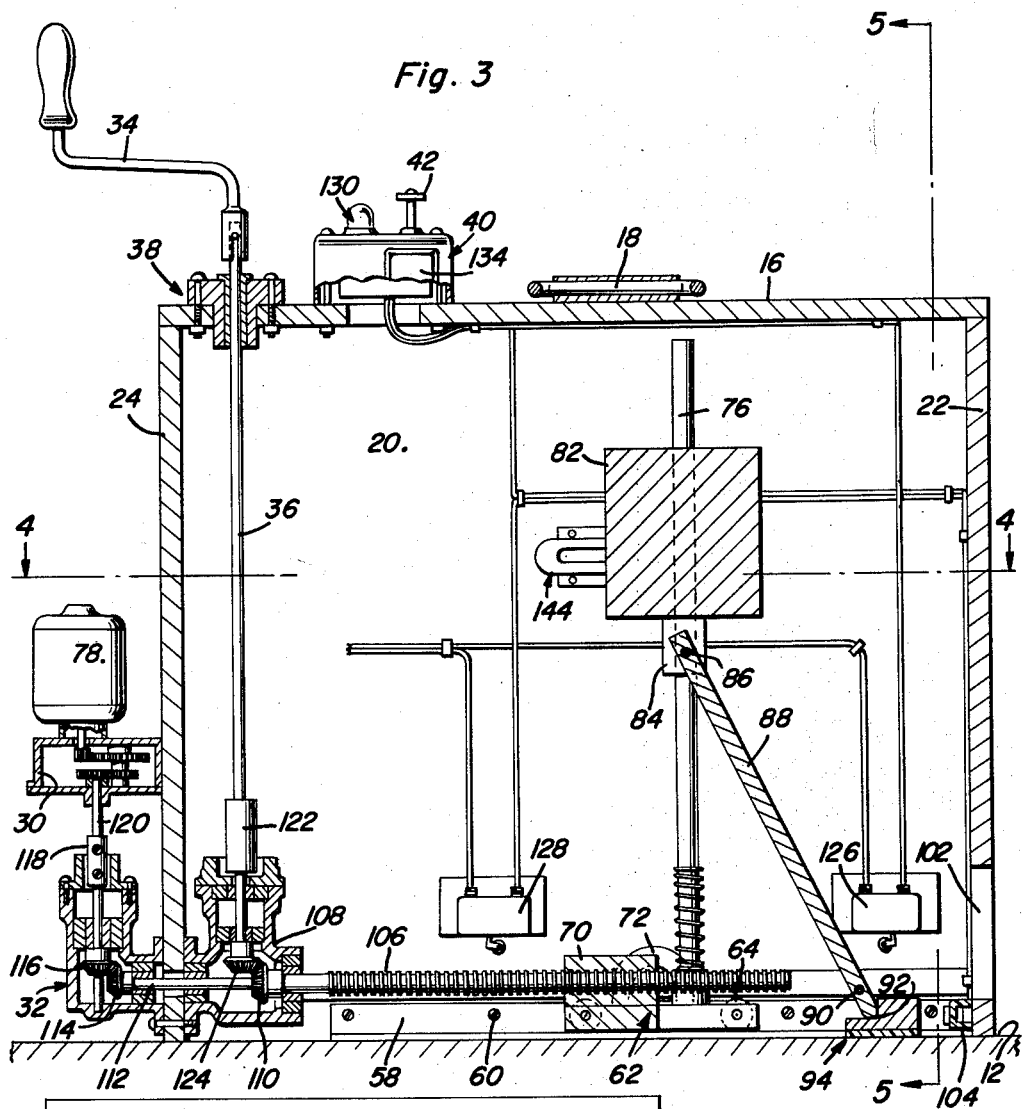
FIGURE 3 is a longitudinal side sectional view taken substantially through a plane indicated by section line 3—3 in FIGURE 2.

Referring now to the drawings in detail, it will be observed from FIGURE 1, that the friction testing device generally referred to by reference numeral 10 is adapted to be brought to and placed upon a surface 12 to be tested. The various components of the device 10 are therefore supported on and held within a casing generally referred to by reference numeral 14 which may be of any suitable shape and size, preferably of a size small enough to render the device portable. The casing 14 may therefore include a top 16 to which a handle 18 is connected. The casing may also include a back wall 20, a side panel 22, an opposite side wall 24 and a front wall 26. The casing walls will be made of a non-skid material so that the bottom edges of the back wall, end walls 22 and 24 and front wall 26 will rest upon the surface 12 without movement during operation of the machine. The machine is therefore provided with power operating facilities including an electric motor 28 mounted by the gear reducer casing 30 secured to the end wall 24 as more clearly seen in FIGURES 1, 2 and 3. The motor 28 is of the reversible type drivingly connected by the gear reducer to an angle drive 32 also mounted on the end wall 24. The output of the gear reducer may be disconnected from the angle drive 32 when manual operation is desired, manual operation being achieved through use of the removable hand crank 34 coupled to the crankshaft 36 which projects upwardly through a bearing assembly 38 secured to the top wall 16 of the casing. The operative condition of the device will be indicated through the control box 40 also mounted on the top wall 16 of the casing, the control box also mounting a selector switch actuator 42 through which the device may be controlled when being operated by the electric motor 28. The frictional property data obtained by use of the machine will be recorded on a recording graph 44 mounted on the inside of a recording panel 46 which closes an opening 48 formed in the front wall 26, the recording panel 46 being hingedly connected to the front wall along its bottom edge by the hinge 50 as more clearly seen in FIGURE 5. The external surface of the panel 46 is therefore provided with a knob 52 and is held in closed position by a releasable latch 54 mounted on the front wall 26.

As more clearly seen in FIGURE 5, the bottom edges 56 of the vertical wall portions of the casing rest upon the surface 12 to be tested and secured to the lower portions of the back wall 20 and front wall 26 adjacent the bottom edges, are a pair of track members 58 secured by a plurality of fasteners 60 to the back wall and front wall as more clearly seen in FIGURE 3 for slidably supporting a carriage assembly generally referred to by reference numeral 62. The carriage assembly therefore includes two pair of guide rollers 64 received on the track members 58. One pair of the rollers 64 are rotatably mounted by a pair of spaced forward portions 66 of the carriage assembly while the other pair of rollers are rotatably mounted on opposite sides of the rear portion 68 of the carriage assembly as more clearly seen in FIGURE 4. An internally threaded nut portion 70 is fixed to the rear portion 68 of the carriage while on one side of the carriage intermediate the forward and rear portions thereof is mounted a switch actuating cam portion 72. Also mounted on the spaced forward portions 66, are a pair of shock absorbers 74 from which a pair of substantially vertical guide rods 76 extend in an upward direction for slidably mounting thereon a load applying assembly generally referred to by reference numeral 78. The lower portions of the guide rods 76 are therefore provided with a pair of shock absorbing spring elements 80 for yieldably limiting downward movement of the load applying assembly 78 by initial shock take-up.

The load applying assembly includes a weight member 82 provided with a pair of bores through which the guide rods 76 extend. The lower surface of the weight number is provided with a pivot bracket 84 disposed between the guide rods 76 through which an axle pin 86 extends for pivotally connecting to the weight member, the upper end of a test arm 88. Thus, when the test arm 88 is suspended along a gravitational vertical from the axle pin 86, it will be disposed between the guide rods 76. In this position, a laterally projecting pin 90 at the lower end of the test arm 80 will rest on the carriage assembly 62 to support the weight member 82. Thus, the lower bearing contact end 92 of the test arm may then receive thereabove a test shoe element generally referred to by reference numeral 94.

As more clearly seen in FIGURE 9, the test shoe element 94 may be one of several of such elements interchangeably positioned within the device including a block portion 96 having a curved seating portion 98 for receiving the lower end 92 of the test arm. Each test shoe element will have on the lower surface thereof, a different type of friction material 100 whereby the frictional property characteristics of the surface 12 may be tested with respect to different types of friction material in contact therewith. The test shoe element 94 is therefore adapted to be inserted and replaced through an access opening 102 formed adjacent the lower end of the end wall 22 which is formed just above a stop switch component 104 secured to the end wall 22 and adapted to be engaged by the test shoe element 94 when displaced by a limited amount from an operative starting position in which it is disposed. In the operative starting position, the test shoe element is therefore vertically aligned along the gravitational vertical with the weight member 82. Accordingly, the carriage assembly 62 will be initially positioned in the starting conditions of the device to the right of the position illustrated in FIGURES 1, 3 and 4 so that the guide rods 76 will be disposed on opposite lateral sides of the test shoe 94 which will then be between the spaced forward portions 66 of the carriage assembly. From this starting position, the carriage assembly will be moved to the left as viewed in FIGURES 1, 3 and 4 so as to displace the weight member 82 therewith. The lower end 92 of the test arm 88 will remain in engagement with the test shoe while the upper end at the axle 86 will pivot with respect to the lower end to transfer the load of the weight member 82 onto the test shoe along a line disposed at an angle to the gravitational vertical. This angle will increase so as to increase the force which tends to displace the test shoe toward the right against the static friction developed between the surface 12 and the friction material 100 on the test shoe. When this static limiting friction is exceeded, the test shoe will move a slight distance to the right from the position illustrated in FIGURE 3, for example, so as to engage the stop switch whereby leftward movement of the carriage assembly 62 is stopped.

Movement of the carriage 62 is effected by means of rotation of a screw shaft 106 which is rotatably mounted at its left end as viewed in FIGURE 3 by a transmission gear housing 108 disposed within the casing and fixed to the lower end of the end wall 24 thereof. The screw shaft 106 is threadedly engaged with the nut portion 70 and is adapted to be rotatably driven by means of the bevel gear 110 secured to the left end thereof within the transmission housing 108. The screw shaft has connected thereto a shaft extension 112 which extends out of the end wall 24 of the casing and terminates in a bevel gear 114 disposed in the right angle drive casing 32. The bevel gear 114 is therefore in mesh with the bevel gear 116 connected by the disconnectible coupling 118 to the output shaft 120 of the gear reducer 30 to which the output of the reversible motor 28 is connected. Accordingly, rotation of the motor 28 in one direction will slowly rotate the screw shaft 106 so as to impart linear movement to the carriage assembly 62 at a constant rate of speed in one direction from the aforementioned starting position of the carriage assembly in which the test arm 88 will be vertically aligned above the test shoe 94 with which it is in engagement. Alternatively, movement may be imparted to the carriage assembly by means of the hand crank 34 drivingly connected to the upper end of the crankshaft 36, the lower end of which is connected by the coupling 122 to the drive bevel gear 124 which meshes with the bevel gear 110. When, however, movement is imparted to the carriage assembly through energization of the reversible motor 28, control over its energization will be necessary. Accordingly, the back wall 20 of the casing mounts there within a forward limit switch 126 adapted to be engaged by the switch actuating cam 72 of the carriage assembly when the carriage assembly is in the starting position. Movement of the carriage assembly in a leftward direction will be restricted by engagement of the actuator cam 72 with a reverse limit switch 128 also mounted on the back wall 20. It will also be appreciated, that movement of the carriage assembly will ordinarily be stopped before the reverse limit switch 128 is engaged because of the engagement of the stop switch 104 by the test shoe. The reverse limit switch 128 is provided however in the event the limiting static friction is not within the expected range to which the friction testing device is limited. The stop switch 104, the forward limit switch 126 and the reverse limit switch 128 are therefore all wired to the control box 40 on which the selector switch 42 is mounted. Also mounted on the control box 40 is a test indicator lamp 130 and a reset indicator lamp 132 by means of which the user may tell whether the device is undergoing its testing procedure and if the device has been reset in order to begin a testing operation by actuation of the selector switch 42. The control box also mounts a relay portion 134 for purposes to be hereafter explained. In order to provide illumination for the interior of the device, an internal lamp 136 is also mounted on the inside surface of the top wall 16 adjacent the end wall 24 as shown in FIGURE 5.

Figure 6:
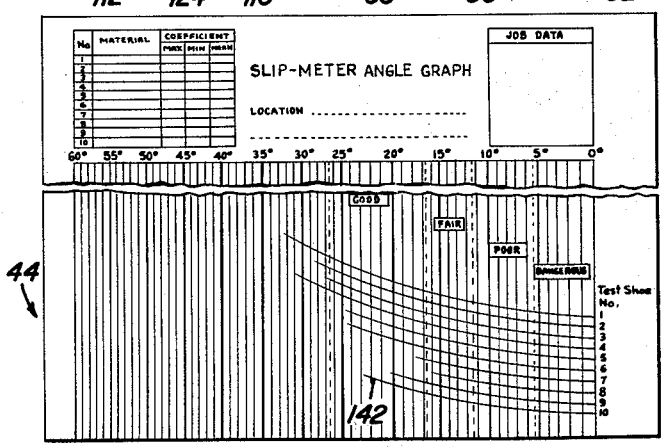
FIGURE 6 is an illustration of the recording graph associated with the friction testing device.

When the carriage is being slowly moved in a leftward direction so as to vary the angle assumed by the test arm with respect to the test shoe, movement of the weight member 82 in a leftward direction along the tracks 58 and downward along the guide rods 76, will be recorded by means of a recording pen or stylus 138 received within one of a plurality of vertically spaced bores 140 formed on one lateral side of the weight member 82, the stylus being spring-biased outwardly from the bore 140 within which it is received for engagement of the pen with the recording graph 44 mounted on the inside of the panel 46. Accordingly, the recording pen will trace one of the lines 142 as illustrated on the graph 44 in FIGURE 6, the tracing of the line terminating at the point at which movement of the carriage and the weight member 82 mounted thereon is stopped. Stoppage of the carriage will occur upon displacement of the test shoe into engagement with the stop switch 104 as aforementioned so that the terminal point of the line 142 traced will reflect the angle finally assumed by test arm at the point of limiting static friction from which the coefficient of static friction may be computed. The recording graph 44 may therefore also receive thereon additional information such as the temperature and the inclination of the surface 12 being tested, the information as to this inclination of the test surface being obtained in any suitable manner as for example by the mounting of a graduated level device 144 on the back wall 20 as shown in FIGURES 3 and 5.

It will be apparent from the foregoing, that computation of the static friction coefficient may be accurately obtained through use of the test device since the test arm 88 in its starting position will be disposed along the gravitational vertical which is not necessarily perpendicular to the surface 12 because of its inclination. The inclination of the surface being tested will affect the static coefficient computation for which reason more accurate data is obtainable with the device of the present invention. Referring therefore to FIGURE 7, it will be observed that the angle $\phi$ moved by the test arm 88 with respect to gravitational vertical will differ from the angle between the test arm and the line extending through the guide rods 76 in view of the inclination of the surface 12 at an angle $\theta$. The foregoing relationship is shown in an exaggerated manner in FIGURE 7. It will also be apparent, that the recording of the movement of the upper end of the test arm in one direction parallel to the test surface will stop at the point of limiting friction if the test shoe is abruptly displaced by its limit amount into engagement with the stop switch 104. However, movement may not be so abrupt under certain test conditions particularly when measuring the limiting point of friction for certain plastics, papers and certain lubricants. The test shoe may accordingly "creep" when displacement thereof begins, this creep being also recorded as reflected by an abrupt change in the movement of the upper end of the test arm as reflected on the recording, from which the exact point of creep may be obtained.

Referring now to FIGURE 8, the operation and control of the friction testing device will become apparent. It will therefore be observed, that for powered operation, the device will be connected to a source of electrical energy by means of the powerlines 146 and 148. Connected across the powerlines is the internal illuminating lamp 136. The powerline 146 is connected to one terminal of the reversible motor 28 with energizing circuits for the motor being completed through the conductors 150 and 152 to respectively produce forward and reverse rotation of the motor. When the device is in its reset condition or in a condition prepared for initiating a friction test, the carriage 62 will be in its starting poistion holding the normally closed forward limit switch 126 open to open the circuit through line or conductor 152 while the reverse limit switch 128 and the test shoe stop switch 104 will be closed so as to complete an energizing circuit through the line or conductor 150 with the relay coil 156 being deenergized. The selector switch 42 may then be displaced to a test position engaging the test contact 158 so as to complete a forward energizing circuit for the motor 28 through the closed limit switch 128 and stop switch 104 after displacement of the test shoe 94 from engagement with the stop switch into vertical alignment with the test arm 88 in the starting position of the carriage 62. The forward limit switch 126 will therefore close upon movement of the carriage from its starting position so as to complete an energizing circuit through the relay coil 156 causing the relay switch 154 to complete an energizing circuit through the test indicating lamp 130. The test indicating lamp 130 will therefore be illuminated during the testing procedure whenever the selector 42 engages contact 158 for forward energization of the motor 28. The test is stopped when the test shoe 94 is displaced into engagement with the stop switch 104 thereby opening the forward energizing circuit for the motor 28 and lamp 130. The relay coil 156 remains energized through line 150. The lamp 132 will however be extinguished since the stop switch 104 is open. The selector switch 42 may then be actuated to the reset position in engagement with the reset contact 160 thereby shunting the relay coil 156 so that a reverse energizing circuit through the motor 28 is established as the relay coil is de-energized. The relay switch 154 will then complete an energizing circuit through lamp 132 to indicate the device is being reset as long as the motor 28 is energized for reverse rotation. The carriage 62 will therefore be displaced towards its starting position by the motor 28 at which point both the motor and lamp 132 will be de-energized by opening of the forward limit switch 126. It will therefore be apparent, that the lamps 130 and 132 will be respectively illuminated when the device is undergoing a test and when the device is being reset so as to avoid improper actuation of the selector 42. When reset, the device may be set into operation for testing purposes by the selector switch engaging the test contact 158. When the testing operation has stopped, the device may be reset by the selector switch 40 engaging the reset contact 160. Operations will stop therefore when the stop switch 104 is opened by the test shoe or when the reverse limit switch 128 is engaged by the carriage actuator 72 to prevent overtravel of the carriage in the event that the friction range is exceeded.

From the foregoing description, the operation, construction and utility of the friction testing device will be apparent. It will therefore be appreciated, that the friction testing device is portable, operates in a stationary condition on a stationary surface on which the device is placed. Friction tests may thereby be obtained between any two materials by easy interchange of the test shoe element. A direct self-reading recording is obtained by the device from which friction property computations may be made. The device also enables the determination of the exact point of "creep" in connection with frictional surfaces characterized by such a "creep" phenomenon. Also, the data obtained by the friction testing device takes into account the inclination of the surface being tested so as to avoid any accurate leveling of the device in order to obtain the necessary readings from which computations may be made.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A friction testing machine comprising, supporting frame means adapted to rest without skidding on a surface to be tested, an interchangeable friction surface element in contact with said surface to be tested, vertical load applying means movably mounted by said frame means, motive means for imparting movement to said load applying means, load transfer means rendered operative on the friction surface element in response to said movement of the load applying means to vary the static friction resisting displacement of the friction surface element from vertical alignment with the load applying means at a starting position, means responsive to limited displacement of the friction element when the static friction is exceeded for stopping movement of the load applying means from said starting position and means for recording linear movement of the load applying means before and during said limited displacement of the friction surface element.

2. The combination of claim 1, including reset means for restoring said load applying means to the starting position only following said limited displacement of the friction surface element, said motive means being rendered operative in response to restoration of the load applying means to said starting position for selectively imparting said movement to the load applying means when the friction surface element is vertically aligned therewith.

3. The combination of claim 2, including indicating means for detecting said movement of the load applying means to and from the starting position.

4. The combination of claim 3, wherein said load transfer means comprises a rigid test arm pivotally connected to the load applying means at an upper end thereof and having a lower end in releasable engagement with the friction surface element, whereby replacement of the friction surface element is facilitated.

5. The combination of claim 4, wherein said load applying means comprises, a carriage slidably mounted by the frame means, vertical guide means mounted on the carriage, and a weight member slidably mounted on the guide means and operatively connected to the load transfer means.

6. The combination of claim 5, wherein said motive means comprises, reversible drive means operatively connected to the load applying means for imparting linear movement thereto at a constant rate of speed.

7. The combination of claim 1, including indicating means for detecting said movement of the load applying means to and from the starting position.

8. The combination of claim 1, wherein said load transfer means comprises a rigid test arm pivotally connected to the load applying means at an upper end thereof and having a lower end in releasable engagement with the friction surface element, whereby replacement of the friction surface element is facilitated.

9. The combination of claim 1, wherein said load applying means comprises, a carriage slidably mounted by the frame means, vertical guide means mounted on the carriage, and a weight member slidably mounted on the guide means and operatively connected to the load transfer means.

10. A portable friction testing machine comprising, a casing adapted to rest upon a surface to be tested which has a measured inclination, test surface means positioned within said casing in contact with said surface to be tested for sliding in one direction relative thereto, load means movably mounted within said casing and engageable with said test surface means in an operative position wherein said one direction of sliding is substantially perpendicular to the direction of force applied by the load means, means for moving the load means to progressively transfer the load of the load means to the test surface means, indicating means responsive to displacement of the test surface means on the surface to be tested for indicating the value of limiting static friction between said test surface means and the surface to be tested, and means for limiting displacement of the test surface means between said operative position and a position from which it may be replaced.

11. The combination of claim 10 including reversible drive means for imparting constant linear movement to the load means in one direction and restoring movement in the opposite direction, limit means for rendering the reversible drive means operative in said one direction of sliding when the direction of force applied by the load means is perpendicular to the one direction of sliding of the test surface means, and means responsive to displacement of the test surface means from said operative position for disabling the drive means to stop movement of the load means.

12. A method of testing and computing the static friction of an inclined surface comprising the steps of: placing a friction material in free contact with said surface; applying a vertically spaced gravitational load on said friction material; displacing the load away from vertical alignment with the friction material until the friction material is displaced along said surface; recording the movement of said gravitational load before and during displacement of the friction material along said surface; and measuring the inclination of the inclined surface.

13. A friction testing machine comprising, supporting frame means adapted to rest without skidding on a surface to be tested, an interchangeable friction surface element in contact with said surface to be tested, vertical load applying means movably mounted by said frame means, load transfer means rendered operative on the friction surface element in response to movement of the load applying means to vary the static friction resisting displacement of the friction surface element from vertical alignment with the load applying means at a starting position, means responsive to limited displacement of the friction element when the static friction is exceeded for stopping movement of the load applying means from said starting position and recording means for indicating changes in the movement of the load applying means before and during said limited displacement of the friction surface element, said recording means including, a stylus mounted on the load applying means for movement therewith, a removable panel mounted by the frame means and a recording graph mounted on the panel for exposure to the stylus to trace the movement of the load applying means.

14. A friction testing machine comprising, a supporting frame, a carriage mounted by the frame for linear movement in one direction, a weight, guide means carried by the carriage and operatively mounting the weight thereon for movement relative to the carriage in a direction perpendicular to said one direction of movement of the carriage, a test element freely resting on a surface to be tested and adapted to be positioned vertically below the weight, a load transfer link pivotally connected to the weight, bearing contact means on the link and the test element for transferring the load of the weight from the link to the test element, and means for recording movement of the weight relative to the supporting frame in response to linear movement of the carriage from a starting position wherein the test element is aligned vertically below the weight.

15. The combination of claim 14 including means mounted on the load transfer link and engageable with the carriage for relieving the load imposed on the test element only in said starting position of the carriage.

16. The combination of claim 15 including drive means operatively connected to the carriage for imparting movement thereto at a constant linear speed from said starting position.

17. The combination of claim 16 including stop means engageable by the test element upon displacement thereof by a predetermined distance from the starting position of the carriage for stopping movement of the carriage and the recording of said movement of the weight relative to the frame.

18. The combination of claim 14 including drive means operatively connected to the carriage for imparting movement thereto at a constant linear speed from said starting position.

19. The combination of claim 18 including stop means engageable by the test element upon displacement thereof by a predetermined distance from the starting position of the carriage for stopping movement of the carriage and the recording of said movement of the weight relative to the frame.

20. In an instrument for measuring the coefficient of friction of a surface, a support to rest on said surface, guide rods, a pair of parallel tracks fixed to the support for guiding linear movement of the guide rods in one direction relative to the support, a weight slidable on said guide rods under the influence of gravity, a friction element in frictional engagement with said surface for movement therealong free of the support, a link pivotally connected to the weight and engageable with said element at an angle relative thereto and said surface that depends on the position of the guide rods, measuring means including a part connected to the weight to indicate movement thereof with reference to a position of the weight in vertical alignment with said element, and means connected to the guide rods for imparting linear movement to the weight at a constant speed from said position thereof.

21. A method of measuring the coefficient of friction of a surface comprising the steps of: placing a friction test element on said surface for movement thereon without constraint; applying a gravitational load on the test element; displacing the gravitational load in one direction relative to the test element at a substantially constant speed for varying the displacing force imposed thereon; and recording the movement of the gravitational load before and during movement of the test element by the varying displacing force imposed thereon.

References Cited by the Examiner

UNITED STATES PATENTS

| | | | |
|---|---|---|---|
| 2,955,455 | 10/60 | Frederic | 73—9 |
| 3,098,377 | 7/63 | Beauchamp | 73—9 |

RICHARD C. QUEISSER, *Primary Examiner.*

DAVID SCHONBERG, *Examiner.*